(12) United States Patent
Jiang

(10) Patent No.: US 8,285,000 B2
(45) Date of Patent: Oct. 9, 2012

(54) MONITORING SYSTEM AND METHOD

(75) Inventor: Jin-Lin Jiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1027 days.

(21) Appl. No.: 12/253,939

(22) Filed: Oct. 17, 2008

(65) Prior Publication Data

US 2010/0315497 A1     Dec. 16, 2010

(30) Foreign Application Priority Data

Jun. 20, 2008 (CN) .......................... 2008 1 0302260

(51) Int. Cl.
*G06K 9/00* (2006.01)

(52) U.S. Cl. ........................................ 382/115; 382/117

(58) Field of Classification Search .................. 382/112, 382/114, 115, 100, 118; 348/143
See application file for complete search history.

(56) References Cited

U.S. PATENT DOCUMENTS

| | | | |
|---|---|---|---|
| 7,801,431 B2 * | 9/2010 | Wang et al. ..................... 396/79 |
| 8,031,957 B1 * | 10/2011 | Vinchon ....................... 382/241 |
| 8,149,324 B2 * | 4/2012 | Oikawa ........................ 348/349 |
| 8,199,979 B2 * | 6/2012 | Steinberg et al. ............. 382/118 |
| 2008/0002048 A1 * | 1/2008 | Ito et al. ......................... 348/345 |
| 2008/0080743 A1 * | 4/2008 | Schneiderman et al. ..... 382/118 |
| 2008/0231819 A1 * | 9/2008 | Chang et al. .................. 353/121 |
| 2008/0273097 A1 * | 11/2008 | Nagashima ............... 348/231.99 |
| 2008/0297588 A1 * | 12/2008 | Kurtz et al. ................. 348/14.08 |
| 2009/0016645 A1 * | 1/2009 | Sako et al. .................... 382/298 |
| 2009/0059008 A1 * | 3/2009 | Ishii ............................. 348/169 |
| 2009/0187187 A1 * | 7/2009 | Asirvatham et al. ........... 606/42 |

FOREIGN PATENT DOCUMENTS

| | | |
|---|---|---|
| CN | 1344966 A | 4/2002 |
| CN | 101174337 A | 5/2008 |

* cited by examiner

*Primary Examiner* — Wesley Tucker
*Assistant Examiner* — Nancy Bitar
(74) *Attorney, Agent, or Firm* — Altis Law Group, Inc.

(57) ABSTRACT

A monitoring system includes an image capturing module, a displaying module, a face recognition module, a memory module, and a searching module. The image capturing module is configured for capturing images and videos. The face recognition module is configured for recognizing a number of human faces in the captured videos, and generating a number of groups of profile information each associated with a recognized face when the image capturing module captures the video. The memory module is configured for storing the captured videos and the profile information. The searching module is configured for receiving a group of input profile information, and searching whether a group of profile information stored in the memory module matches the group of the input information. The displaying module is configured for displaying the group of captured images associated with the group of profile information matched the group of input profile information.

11 Claims, 3 Drawing Sheets

MONITORING SYSTEM AND METHOD

BACKGROUND

1. Technical Field

The present disclosure relates to monitoring systems and, particularly, to a monitoring system and a monitoring method.

2. Description of the Related Art

Conventional monitor systems typically include a number of telecameras, a number of monitors, and a number of video cassette recorders. The telecameras aim at a scene so as to capture images of the scene from different directions, and output surveillance videos to the monitors for monitoring in real time. The surveillance videos are stored in the video cassette recorders.

One of the disadvantages of utilizing such a monitoring system is that in order to find a target person in the surveillance videos, all the surveillance videos need to be reloaded from the cassette recorders, and checked one by one. This manual searching task is time-consuming and inefficient.

What is needed, therefore, is a monitoring system and a monitoring method, which can overcome the above-described problem.

BRIEF DESCRIPTION OF THE DRAWINGS

Many aspects of the present monitoring system and method should be better understood with reference to the accompanying drawings. The components in the drawings are not necessarily drawn to scale, the emphasis instead being placed upon clearly illustrating the principles of the monitoring system and method. Moreover, in the drawings, like reference numerals designate corresponding parts throughout the several views.

DETAILED DESCRIPTION

Embodiments of the present monitoring system and method will now be described in detail with reference to the drawings.

Figure 1:
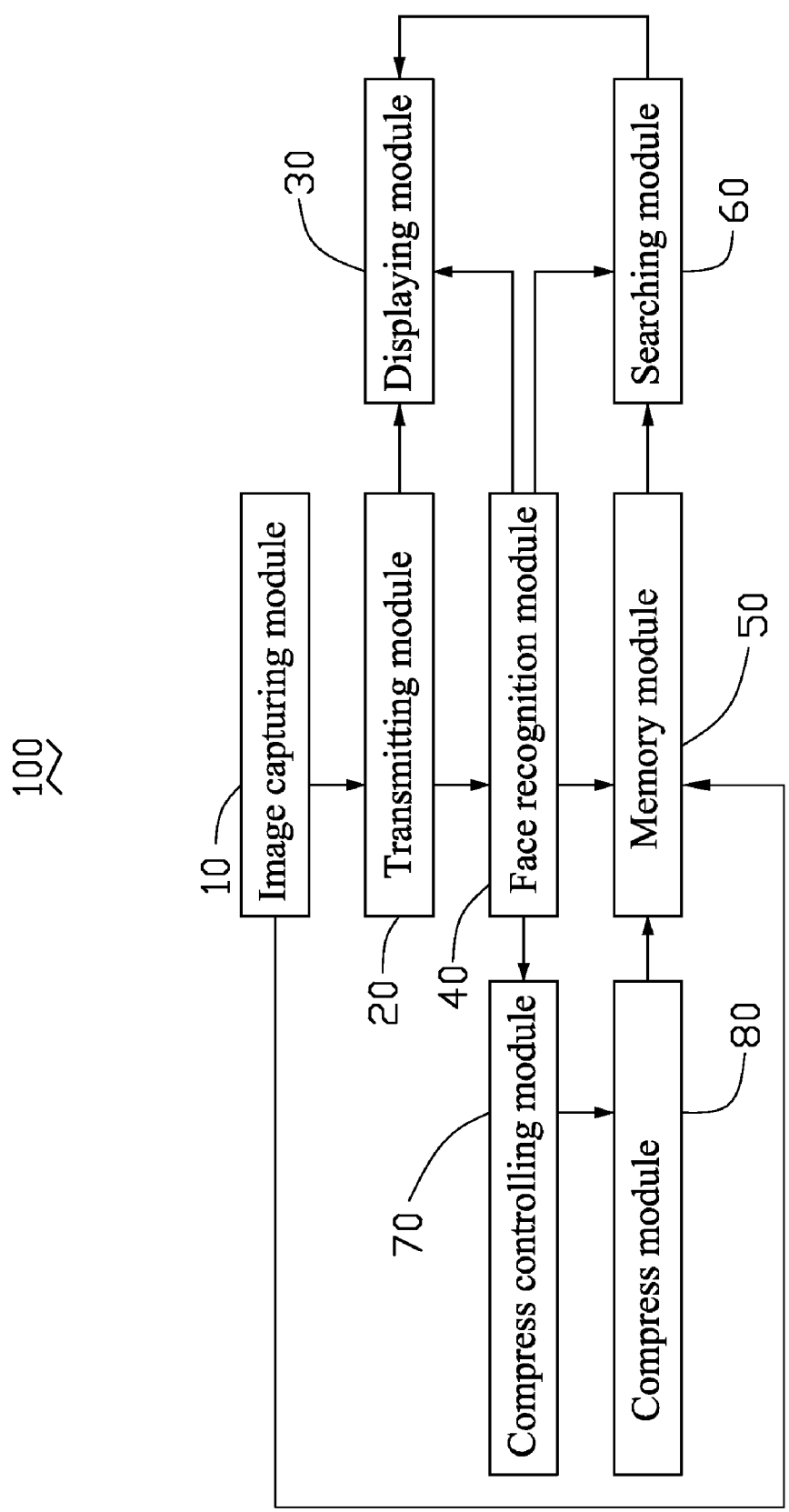
FIG. 1 is a functional block diagram of a monitoring system including an imaging capturing unit in accordance with an exemplary embodiment.
Figure 2:
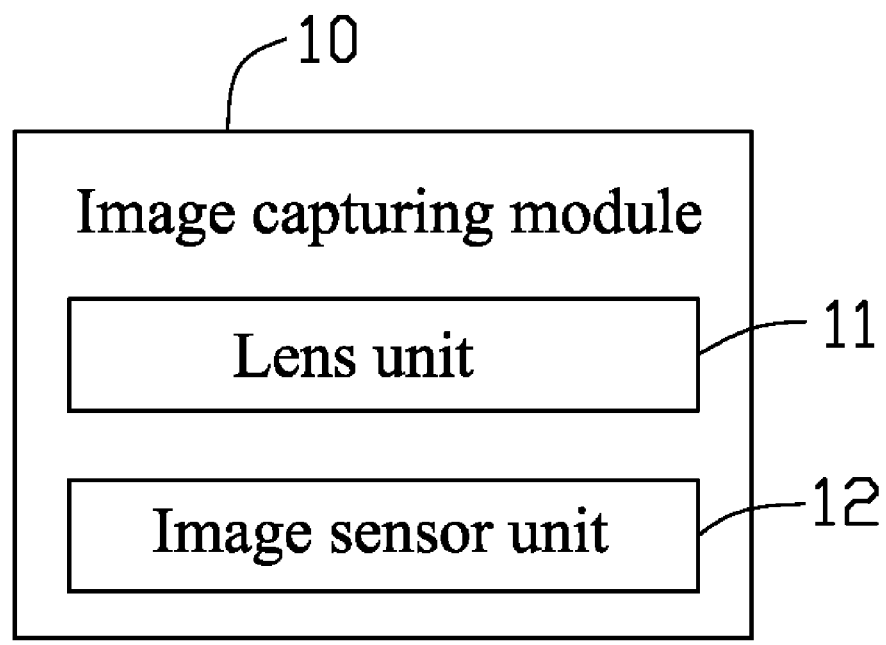
FIG. 2 is a functional blocks diagram of the imaging capturing unit of FIG. 1.

Referring to FIG. 1 and FIG. 2, a monitoring system 100, according to an exemplary embodiment, includes at least one image capturing module 10, a transmitting module 20, a displaying module 30, a face recognition module 40, a memory module 50, and a searching module 60. The multiple image capturing modules 10 are configured for capturing images or videos. The transmitting module 20 is configured for transmitting the captured videos to the displaying module 30 and the face recognition module 40. The face recognition module 40 is configured for recognizing a number of human faces in the captured videos or the captured images, and generating a number of groups of profile information each associated with a recognized face when the image capturing module 10 captures the video. The memory module 50 is configured for storing the captured videos and the profile information. The searching module 60 is configured for receiving a group of input profile information, and searching whether a group of profile information stored in the memory module 50 matches the group of the input profile information, wherein the input information is a target person's profile information. The displaying module 30 is configured for displaying the group of captured videos or images associated with the group of profile information matched the group of input profile information.

In this embodiment, multiple image captured modules 10 aim at a monitored area from different directions. Each of the captured modules 10 includes a lens unit 11 and an image sensor unit 12. The lens unit 11 may include one or more lenses. The lens unit 11 can be, for example, a zoom lens or a focus lens. The image sensor 12 can be a charge coupled device (CCD) image sensor or a complementary metal oxide semiconductor (CMOS) image sensor. Ceramic leaded chip carrier (CLCC) package, a plastic leaded chip carrier (PLCC), or a chip scale package (CSP) may be used for packaging the image sensor unit 12. The lens unit 11 is configured for forming an optical image on the image sensor unit 12. The image sensor unit 12 is configured for converting the optical image into an digital image signal.

The transmitting module 20 may be an optical fiber.

In this embodiment, the monitor system 100 includes a number of displaying modules 30. Each of the displaying modules 30 is configured for carrying out real-time monitoring. Each of the displaying modules 30 includes an LCD screen. The number of the displaying modules 30 can varies depending on requirements.

In alternative embodiments, the number of the image capturing modules 10 and the displaying modules 30 both can be only one, and the transmitting module 20 can be omitted.

The face recognition module 40 may be realized by any existing face recognition method and device.

In this embodiment, the face recognition module 40 recognizes all of face images in the captured videos captured by the image capturing module 10, and generates a number of groups of profile information each associated with a recognized face. The groups of profile information are then stored in the memory module 50. In the process of searching for a target person in the stored captured videos, first, one of the image capturing modules 10 captures the target person's image, and the face recognition module 40 generates a group of profile information of the target person's face as input profile information. The searching module 60 receives the input profile information, and searches through the stored groups of profile information generated from the captured videos to determine whether the input profile information matches one group of the profile information stored in the memory module 50. Since every person has a unique face profile information. If the input profile information is identical to profile information stored in the memory module 50, it means that the target person was in the videos, and the displaying module 30 will display the result.

In this embodiment, the monitor system 100 further includes a compress controlling module 70, and a compress module 80. In use, when the face recognition module 40 don't recognize any human face in the images, the compress controlling module 70 controls the compressing module 80 to compress the captured videos to save memory space. In other embodiments, the compress controlling module 70 and the compress module 80 can be omitted.

Figure 3:
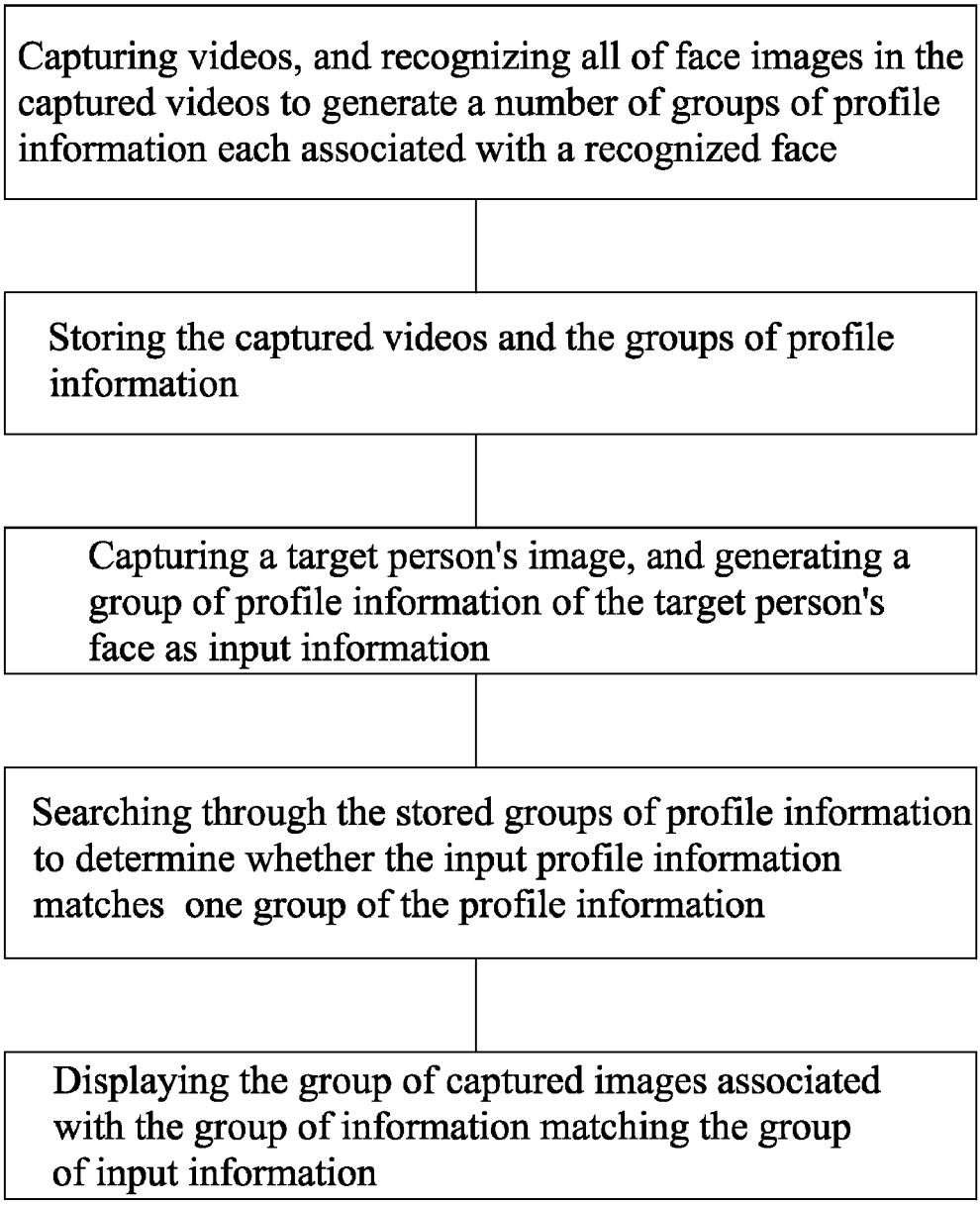
FIG. 3 is a flowchart of a monitoring method, according to another exemplary embodiment.

Referring to FIG. 3, a monitoring method is shown. The method includes the steps of: capturing videos, and recognizing all of face images in the captured videos to generate a number of groups of profile information each associated with a recognized face; storing the captured videos and the groups of profile information; capturing a target person's image, and generating a group of profile information of the target person's face as input information; searching through the stored groups of profile information to determine whether the input profile information matches one group of the profile information stored in the captured videos; displaying the group of captured images associated with the group of information matching the group of input information. The method can further includes a step of compressing the captured videos if not human face is recognized in the images.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A monitor system, comprising:
   at least one image capturing module configured for capturing videos and images;
   a face recognition module configured for recognizing a human face in the captured videos or the images, and generating groups of profile information each associated with the human face;
   a memory module configured for storing the captured videos and the groups of profile information;
   a searching module configured for receiving a group of input profile information, and searching through the stored groups of profile information to determine whether a group of profile information stored in the memory module matches the group of input profile information;
   a displaying module configured for displaying the captured videos or images associated with the group of profile information matching the input profile information;
   a compress controlling module; and
   a compress module capable of compressing the captured video via the control of the compress controlling module, wherein when the face recognition module does not recognize any human face in the images, the compress controlling module controls the compressing module to compress the captured videos.

2. The monitor system as claimed in claim 1, wherein the monitor system further includes a transmitting module configured for transmitting the captured videos or images to the displaying module and the face recognition module.

3. The monitor system as claimed in claim 2, wherein the transmitting module is optical fiber.

4. The monitor system as claimed in claim 1, wherein each of the image capturing modules comprises a lens unit and an image sensor unit.

5. The monitor system as claimed in claim 4, wherein the lens unit is a zoom lens or a focus lens, and is configured for forming an optical image on the image sensor unit.

6. The monitor system as claimed in claim 5, wherein the image sensor unit is configured for converting the optical image into an electrical image signal.

7. The monitor system as claimed in claim 1, wherein the group of input profile formation is obtained follow the process: the image capturing module capturing a target person's image, and the face recognition module generating a group of profile information of the target person's face as input profile information.

8. A monitoring method comprising:
   capturing videos, and recognizing all of face images in the captured videos to generate a number of groups of profile information each associated with a recognized face;
   storing the captured videos and the groups of profile information;
   capturing a target person's image, and generating a group of input profile information of the target person's face as input information;
   searching through the stored groups of profile information to determine whether the input information matches one group of the profile information;
   displaying the group of captured images associated with the group of profile information matching the group of input information;
   compressing the captured videos if no human face is recognized in the images.

9. The monitor system as claimed in claim 1, wherein the at least one image capturing module comprises two or more image capturing modules aiming at a monitored area from different directions.

10. The monitor system as claimed in claim 4, wherein the image sensor unit is a charge-coupled device or a complementary metal oxide semiconductor device.

11. The monitor system as claimed in claim 4, wherein the image sensor unit is one selected from the group consisting of a ceramic leaded chip carrier package type image sensor, a plastic leaded chip carrier package type image sensor and a chip scale package type image sensor.

* * * * *